Figure 1:
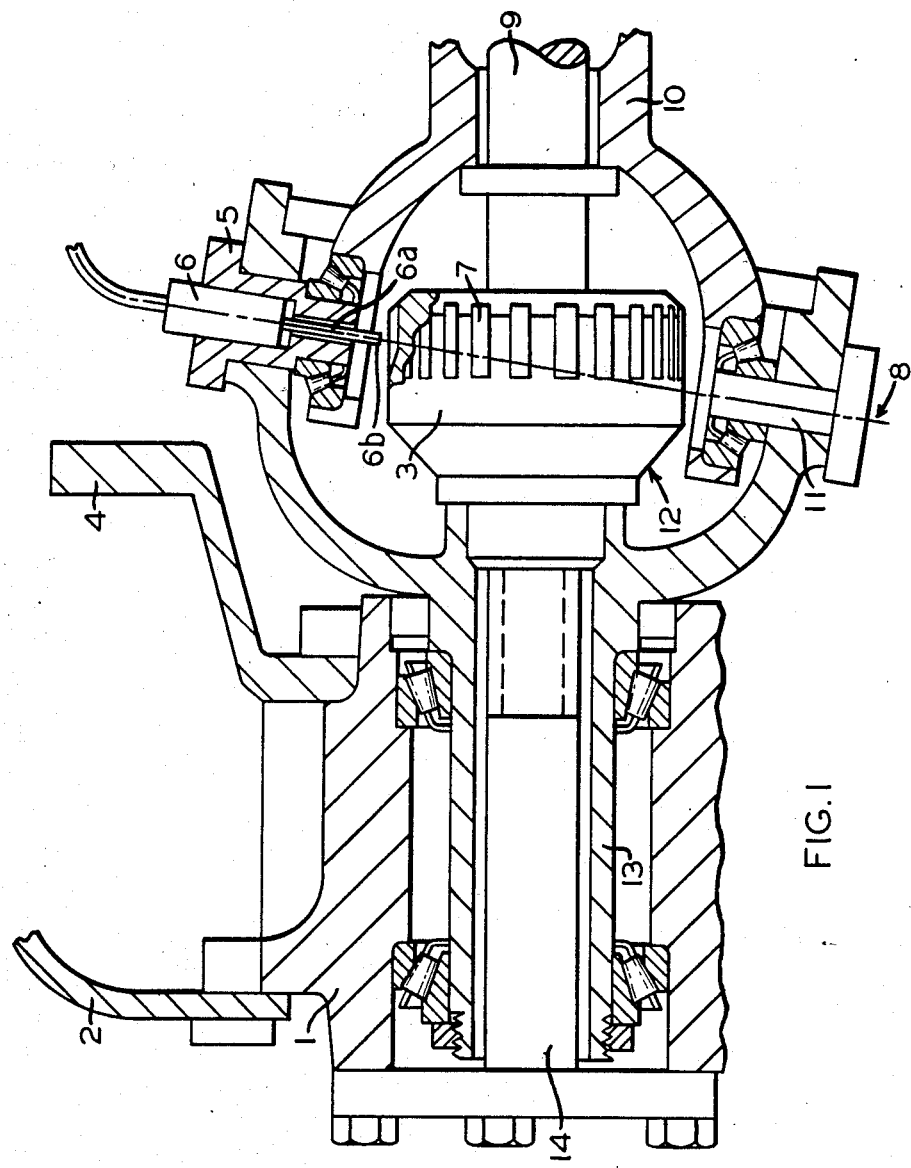

United States Patent [19]

Hofler et al.

[11] Patent Number: 4,689,990

[45] Date of Patent: Sep. 1, 1987

[54] APPARATUS FOR THE ACQUISITION OF SPEED-OF-ROTATION AND/OR ANGLE OF ROTATION SIGNALS ON A DRIVE SHAFT

[75] Inventors: Siegfried Hofler, Hanover; Konrad Rode, Seelze; Reinhard Schmidt, Lehrte, all of Fed. Rep. of Germany

[73] Assignee: WABCO Westinghouse Fahrzeugbremsen GmbH, Hanover, Fed. Rep. of Germany

[21] Appl. No.: 873,735

[22] Filed: Jun. 12, 1986

[30] Foreign Application Priority Data

Jun. 15, 1985 [DE] Fed. Rep. of Germany ....... 3521606

[51] Int. Cl.[4] ............................................ G01M 15/00
[52] U.S. Cl. ................................... 73/118.1; 340/671
[58] Field of Search .......................... 73/118.1; 464/23; 324/173, 174; 310/155; 403/27; 336/135; 340/671; 303/91, 102, 103

[56] References Cited

U.S. PATENT DOCUMENTS 3,719,841 3/1973 Ritsema ........................ 324/174 X

FOREIGN PATENT DOCUMENTS 3341994 5/1985 Fed. Rep. of Germany .
3411773 5/1985 Fed. Rep. of Germany .

OTHER PUBLICATIONS

Daimler-Benz Aktiengesellschaft Service Literature, Oct. 1978, cover and p. 13.

Primary Examiner—Jerry W. Myracle
Attorney, Agent, or Firm—G. P. Baier

[57] ABSTRACT

The invention is an apparatus for the acquisition of speed of rotation and/or angle of rotation signals on a shaft, on which there is a pulse transmitter on the circumference of the joint and a sensor which measures the pulses produced by the pulse transmitter located on a pivot part, which defines a pivot axis, around which the shaft portions of a cardan shaft can be pivoted in relation to one another.

14 Claims, 2 Drawing Figures

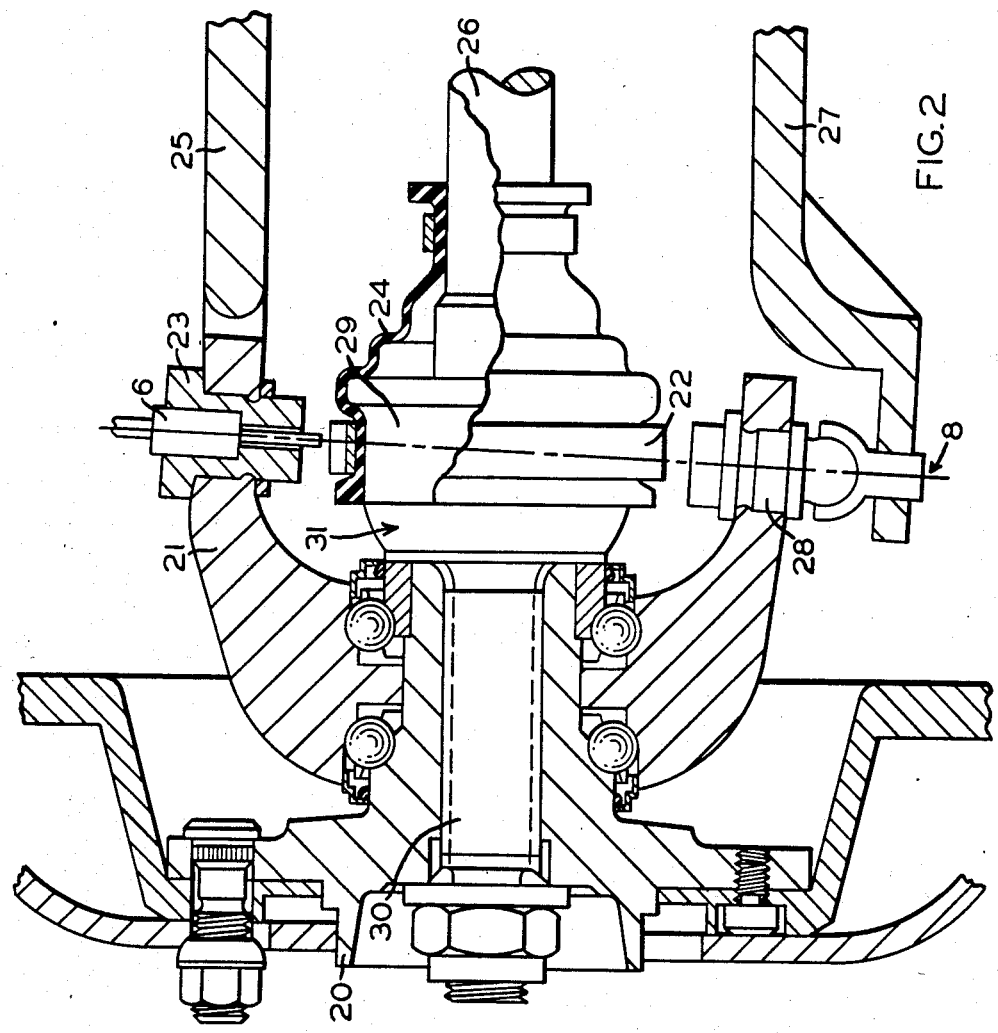

APPARATUS FOR THE ACQUISITION OF SPEED-OF-ROTATION AND/OR ANGLE OF ROTATION SIGNALS ON A DRIVE SHAFT

The invention relates to an apparatus for the acquisition of speed of rotation and/or angle of rotation signals on a drive shaft.

According to the prior art, such an apparatus can be manufactured by installing a pulse transmitter on the output flange of the drive shaft, the pulses from which are measured by a sensor, which is attached to a non-rotating component which one of the disadvantages with the solution according to the prior art is the amount of space it requires. In many applications, it is particularly difficult to make enough space available for the installation of the sensor.

The object of the invention is therefore the improvement of an apparatus of the type described above so that it can be installed to take up less space. This object is achieved by the invention described herein. Refinements and advantageous configurations of the invention are also described.

An apparatus according to the invention can be used in all technical fields, in which torques are transmitted via shaft lines with parts which can be adjusted so that they are in different angular positions in relation to one another. In applications in which the apparatus according to the prior art is exposed to dirty operating conditions and is therefore susceptible to interference, the invention offers the advantage of an apparatus quite impervious to dirt, and with the consequent reduced risk of inoperative devices. The invention also represents an advantageous solution for applications in which the apparatus according to the prior art is exposed to increased temperatures and therefore to an increased risk of interference. Such an application is the presence of a braking apparatus in the vicinity of the driven flange.

As a result of the above-mentioned advantages, the invention can be used to particular advantage in a driven pivoting axle of a motor vehicle, in which the output flange is located in the vicinity of the wheel and the wheel brake, whereby there is only limited installation space available in the vicinity of the output flange, but where, in addition, there is also a great deal of dirt and where the apparatus is exposed to high temperatures. In this case, the invention also reduces the risk of damage to the apparatus if it is struck by stones.

The invention makes it possible to acquire speed or angle of rotation signals both using the inductive method and also using the optical-electrical method. The capacitive method or the Hall-effect method or the Weigand method can also be used, as can the magneto-resistive principle.

In an advantageous configuration, the sensor is located in the hollow pivot bolts. But the sensor can also be located at another point of the pivot bolt, e.g, on its lateral or end surfaces, where it can be fastened by known means. On the end surface, the sensor can be located on the end surface of the pivot bolt facing the universal joint. While the present preferred embodiments show a cardan joint, it is understood that the invention is equally practiced with other types of flexible or universal joints, such as, for example, Hook's couplings, double-links, flexible angular, Bendix-Weiss, splined coupling, or double gimbal mountings.

In an advantageous configuration, the sensor is oriented in the direction of the longitudinal axis of the pivot bolt, e.g., concentric to it, whereby it can advantageously have its sensitive end pointing radially outward toward the cardan joint. Specifically, the sensitive end of the sensor can penetrate the pivot bolt also toward the cardan joint.

If the apparatus is designed inductively, the sensor can be formed from a base sensor and a flux transmitter from a soft-magnetic shaft, which supports a permanent magnet located at any desired point. The flux transmitter can in this case represent the end of the sensor penetrating the pivot bolt. Preferably, the permanent magnet can be located on the end of the flux transmitter toward the cardan joint. The permanent magnet, on account of the small dimensions which thereby become possible, can be made of rare minerals. The solution with the flux transmitter is particularly advantageious if a base sensor which in itself is short is used, as described above.

The length of the pulse transmitter can be kept as small as possible, if it is located on the circumference of the cardan joint, so that its circumferential track or the jacket surface which it describes when the articulated shaft rotates, is penetrated by the pivot axis at least in its region facing the pivot bolt.

The pulse transmitter can, when the invention is used for the acquisition of speed of rotation signals, exhibit a number grooves uniformly distributed over its circumference, between which there are tooth-like radial raised portions. If the invention is also or exclusively to be used for the acquisition of angle of rotation (i.e., rotational position) signals, the pulse transmitter can also exhibit one or more suitable markings, e.g., in the form of specially-configured grooves or raised areas.

The pulse transmitter can be advantageously located on the external circumference of the cardan joint. The pulse transmitter equipped as described above with grooves or raised areas can advantageously be located on an external ring of the cardan joint.

The invention can be used both on drive shafts with a synchronized joint and also on drive shafts with a cardan joint. In the latter case, the above-mentioned external ring can consist of the annular segments connecting the pins of the cardan joint, but they can also be a closed ring pushed over the radial end surfaces of the cardan joint and in this manner enclose the cardan joint.

A cardan joint designed as a synchronized joint generally exhibits bodies which effect the equalization and which transmit the torque, the external guidance of which is exerted by a housing which is fastened to and rotates with a shaft part, and which therefore also serves as an external ring of the cardan joint. This housing part itself can be provided with the grooves or raised areas of the pulse transmitter. In another embodiment, the pulse transmitter can be designed as a ring and installed on the housing part serving as the external ring. In this embodiment, if the cardan joint is enclosed on the outside by a flexible component, e.g., a bellows, the pulse transmitter can also be economically manufactured as a collar to fasten this component to the housing portion.

The invention is explained in greater detail below with reference to the embodiments illustrated in the accompanying figures.

FIG. 1, in partial section, shows the drive shaft of drive output axle of a motor vehicle with a rigid wheel base.

FIG. 2, in partial section, shows the drive shaft of a drive output axle of a motor vehicle with independent suspension.

The same reference numbers are used throughout for identical functions.

FIG. 1 shows a drive shaft, which consists of two shaft parts 9, 14, one of which is a drive shaft 9 and the other of which is an output shaft 14, and a universal or cardan joint 12 which connects them.

The cardan joint 12 is designed as a synchronized joint and exhibits a housing part 3, which also provides external guidance for the bodies of the cardan joint 12 and is therefore simultaneously its external ring.

The housing portion is mounted, in a manner not shown in any greater detail, in a pivot housing 13, which in the present case serves as the axle leg. On the axle leg 13, in a manner not described in any further detail, a wheel hub 1 can rotate, but is axially fixed. The output shaft 14 is mounted in its end toward the cardan joint in the housing part 3, and is connected to and rotates with the latter by means of wedge-shaped teeth or splines, and is bolted to the wheel hub 1 at its other end, by means of an output flange. In this manner, the output shaft 14 is mounted both radially and axially in the axle leg 13.

A wheel 2 and a brake disc 4 are fastened to the wheel hub 1 in a known manner. The drive shaft 9 is mounted in an axle housing 10 in a manner not described in any further detail, and is connected with the drive portion of the cardan joint.

The axle leg 13 is connected with the axle housing 10 by means of an upper axle leg bolt 5 and a lower leg bolt 11, the center axis of which defines a pivoting axis symbolized by center line 8, so that the axle leg 13 can be pivoted in relation to the axle housing 10, and therefore the output shaft 14 can also be pivoted in relation to the drive shaft 9 out of the plane shown in the drawing both forward and backward. The upper axle leg bolt 5 therefore represents a pivot bolt located concentric to the pivot axis 8. The above-mentioned pivot represents a steering action for the vehicle equipped with this apparatus and is effected in a vehicle by a steering lever mechanism (not shown). While the present preferred embodiment shows pivot bolts, other pivot means such as, for example, king pins, pivots, shafts, pins, or ball joints, could be used.

With regard to the rotating axle(s), of the drive shaft, the upper axle leg bolt 5 supports the axle leg 13 so that it rotates with the axle housing 10, which for its part is mounted so that it rotates in the vehicle frame. To take the load off the upper axle leg bolt 5, there is a lower axle leg bolt 11 concentric to it, and therefore also concentric to the pivot axis 8.

The cardan joint housing 3 is placed so that the pivot axis 8 passes generally through the midpoint of the joint. By means of this arrangement, as a result of which the pivot axis 8 intersects the axis of rotation of the drive shaft (if it does not pivot) or the axes of rotation of the drive shafts (namely, of the individual shaft parts 9, 14, if pivoted), the above-mentioned pivoting becomes possible.

On the circumference of the cardan joint 12, or more precisely on the jacket surface of the housing portion 3 which serves as its external ring, there is a rotating pulse transmitter symbolized by 7. This pulse transmitter, as shown by the partial section through the upper region of the housing part 3, shown in the drawing, consists of grooves formed or machined into the housing part 3 and the intervening tooth-like raised portions or areas. Grooves and raised areas are distributed at generally uniform intervals on the outer surface of the housing part 3. The pulse transmitter can be designed as an independent ring and fastened to the housing portion, e.g., shrink-fitted or pressed on.

The top axle leg bolt 5, as shown in FIG. 1, is hollow. Inside it, there is an inductive sensor 6 installed in a known manner.

In the embodiment, the sensor 6 is oriented concentrically in the longitudinal direction of the axle leg bolt 5, and penetrates the latter with its sensitive end in the direction of the cardan joint 12. The sensitive end consists of a soft-magnetic shaft 6a and a permanent magnet 6b located on its tip. The permanent magnet can also be located at any desired point on the shaft. The sensor itself consists of a commercially-available and therefore inexpensive base sensor. The pulse transitter 7 is oriented so that the jacket surface described by it as the drive shaft turns is penetrated by the pivot axis 8 in the area pulse transmitter facing the upper axle leg bolt 5 and thus facing the sensitive end of the sensor 6. This arangement means that, for each pivot angle of the shaft portions 9, 14 to one another when the drive shaft turns, the grooves or raised areas of the pulse transmitter 7 travel through the same relative position to the housing portion 3 under the axle leg bolts 5 or the sensitive end of the sensor 6. This means, on the one hand, that, even in a configuration of the pivot axis 8, which is at an angle in relation to the drive axles of the drive shaft, the sensitive end of the sensor 6 or of the axle leg bolts 5 will always be at the same distance or interval from the pulse transmitter 7. On the other hand, it means that the pulse transmitter 7 travels practically only with one line under the sensitive end of the sensor 6 or the axle leg bolts 5, for which reason the pulse transmitter can be kept small (narrow) in terms of its axial length and that of the housing portion 3.

It is apparent that, if the strength of the field produced by the sensor is sufficient, the sensor and the pulse transmitter can also be arranged in a manner different from the one illustrated. For example, the sensor can also be oriented transverse in the axle leg bolt, or eccentrically in its longitudinal extension. The pulse transmitter can be offset from the illustrated position in the longitudinal direction of the housing part, so that the pivot axis 8 does not penetrate it. In this case, with a restricted location of the pivot axis with different pivot angles, the sensor or its sensitive end, or the position of the field produced by the sensor in the longitudinal direction of the housing part would travel relative to the latter, for which reason, in this case, the width of the pulse transmitter must be appropriately large.

When the drive shaft rotates, disruptions are induced by the grooves or raised areas on the transmitter 7, in the field 6 produced by the sensor 6, which are measured by the sensor 6 and are conducted in a known manner to an evaluation apparatus as signals indicating the speed of rotation.

For the embodiment illustrated in FIG. 2, the above remarks apply, taking the following special features into account.

The axle leg, here numbered 21, serving as the pivot housing, rotates together with the top axle leg bolt, here called 23, but is supported in the plane of the drawing on a top transverse connecting rod identified by number 25. the top axle leg bolt 23 must, for this purpose, be provided in a manner not shown with transverse pins to connect it with the transverse connecting rod 25.

The bottom axle leg bolt 28 located concentric to the pivot axis 8 is designed in a known manner as a ball joint bolt, and is connected via its ball joint with a bottom transverse connecting rod 27 to equalize the forces and torque on the axle leg 21.

The wheel hub 20 is in this case pressed onto the drive shaft 30, and is rotationally connected with the latter via a wedge toothing or spline.

The mounting of the output shaft 30 and of the wheel hub 20 in the axle leg 21 in this case is achieved by means of roller bearings between the wheel hub 20 and the axle leg 21. The roller bearings also provide the axial mounting of the cardan joint 31 (shown in FIG. 2), designed again as a synchronized joint.

In the absence of an axle housing, in this case the cardan joint is connected to the drive shaft 26 by means of a flexible component 24 designed as a bellows. The bellows 24 are connected to a housing portion 29 by means of a collar, which is simultaneously designed as a pulse transmitter 22 and on the outer circumference of which the grooves required as pulse marks are formed. It is apparent that the collar is manufactured with sufficient precision to perform its function as a pulse transmitter 22, and must be provided with a closing mechanism or catch which does not significantly increase its outside circumference.

The pulse transmitters indicated in the embodiments for the acquisition of speed signals can also be designed, in the manner described below, additionally or exclusively for the acquisition of angle of rotation (position) signals. Pulse transmitters and sensors can also be designed according to any other principle suitable for signal acquisition, e.g., opto-electrical or capacitatively, or using the Hall-effect principle. It is apparent that the sensor located in the embodiments in the upper axle leg bolt can also be located in the lower axle leg bolt. Applications are conceivable in which there are sensors located in both axle leg bolts, whereby, for example, the first could measure the speed signals and the other the angle of rotation signals.

It is also apparent that the remarks made above in relation to synchronous joints also apply accordingly, and taking the unique features mentioned above into consideration, to the configuration of the cardan joint as a transverse joint.

Finally, it will also be apparent to a specialist in the field that the embodiments described above in relation to drive axles for motor vehicles do not exhaustively cover the range of application of the invention.

We claim:

1. An apparatus to detect the rotation of a shaft, comprising two shafts, a universal joint which connects said two shafts so that said shafts rotate together, at least one of said shafts is mounted radially in a swivel housing, and is pivotable with said housing around a pivot axis generally passing through the midpoint of said joint, transmitter means for indicating rotational position of said joint located on the circumference of said joint, a sensor means for detecting movement of said transmitter means, and said sensor means being located on said pivot axis.

2. An apparatus according to claim 1, further comprising that said transmitter means is located on the outside circumference of said joint.

3. An apparatus according to claim 1, further comprising that said sensor means is located in a hollow pivot bolt oriented concentric to and said pivot axis.

4. An apparatus according to claim 3, further comprising that said sensor means is located in the longitudinal direction of said pivot bolt.

5. An apparatus according to claim 4, further comprising that said one end of said sensor means penetrates the said pivot bolt in the direction of said joint.

6. An apparatus according to claim 5, wherein said sensor means further comprises an inductive sensor having a flux transmitter consisting of a soft-magnetic shaft portion and a permanent magnet, and said flux transmitter is positioned on the end of said sensor means penetrating said pivot bolt.

7. An apparatus according to claim 1, further comprising a pivot means for rotatably joining said housing in said housing concentric with said pivot axis, said transmitter means located on the circumference of said joint such that the rotational path of the outer surface, which is described when said joint turns, is penetrated by said pivot axis at least in the area of said surface facing said pivot means.

8. An apparatus according to claim 7, further comprising that said transmitter means is located in said pivot means.

9. An apparatus according to claim 1, further comprising that said transmitter means is located on an external ring of said joint, and said ring is grooved to make pulse marks on the outside circumference of said ring.

10. An apparatus according to claim 9, further comprising that said joint is designed as a transverse joint and said external ring is composed of ring segments connecting pins of said transverse joint.

11. An apparatus according to claim 9, further comprising that said joint is designed as a transverse joint and that said external ring is designed as the closed ring which surrounds said transverse joint.

12. An apparatus according to claim 9, further comprising that said external ring is designed as a housing portion of said joint which is designed as a synchronous joint.

13. An apparatus according to claim 9, wherein said transmitter means has a ring installed on a housing portion serving as said external ring of said joint and said joint is a synchronous joint.

14. An apparatus according to claim 13, wherein said transmitter has a collar on said external ring and a flexible component is connected to the outside of said collar.

* * * * *

UNITED STATES PATENT AND TRADEMARK OFFICE
CERTIFICATE OF CORRECTION

PATENT NO. : 4,689,990
DATED : September 1, 1987
INVENTOR(S) : Siegfried Hofler, Konrad Rode, Reinhard Schmidt It is certified that error appears in the above-identified patent and that said Letters Patent are hereby corrected as shown below:

Column 6, line 11, delete "and"

Signed and Sealed this

Nineteenth Day of April, 1988

Attest:

DONALD J. QUIGG

Attesting Officer

Commissioner of Patents and Trademarks